United States Patent [19]

Weeks

[11] Patent Number: 5,423,463
[45] Date of Patent: Jun. 13, 1995

[54] INTERLOCK PANEL

[76] Inventor: Bruce V. Weeks, 12998 Worthington Rd. NW., Pataskala, Ohio 43062

[21] Appl. No.: 74,585
[22] Filed: Jun. 11, 1993
[51] Int. Cl.6 .............................................. B60R 7/00
[52] U.S. Cl. ............................ 224/42.33; 224/42.34; 224/42.42
[58] Field of Search .................. 224/273, 42.32, 42.33, 224/42.34, 42.36, 42.42; 220/552, 529, 532, 533, 543, 544, 542; 296/37.1, 37.5, 37.6; 410/78; 229/120.36, 120.07; 211/184, 189

[56] References Cited

U.S. PATENT DOCUMENTS

| 2,884,154 | 4/1959 | Hobson | 220/552 |
| 3,067,903 | 12/1962 | Jones | 220/552 |
| 3,812,977 | 5/1974 | Glassman | 211/189 |
| 4,595,246 | 6/1986 | Bross | 220/552 X |
| 4,917,429 | 4/1990 | Giger | 296/37.6 |
| 4,932,548 | 6/1990 | Bensinger | |
| 5,052,580 | 10/1991 | Khoury | 220/505 |
| 5,054,668 | 10/1991 | Ricchiuti | 224/42.42 |
| 5,185,982 | 2/1993 | Hostetler | 211/189 X |

FOREIGN PATENT DOCUMENTS

| 4015556 | 11/1990 | Germany | 296/37.5 |
| 472669 | 9/1937 | United Kingdom . | |

Primary Examiner—J. Casimer Jacyna
Assistant Examiner—David J. Walczak
Attorney, Agent, or Firm—Thomas S. Baker, Jr.

[57] ABSTRACT

An interlock panel has a plurality of laterally spaced teeth which define tooth slots and pairs of spaced lugs which define interlock slots. Each tooth slot is aligned with an interlock slot to receive one of the top and bottom area of a panel to provide a double interlock when a pair of panels are joined.

29 Claims, 3 Drawing Sheets

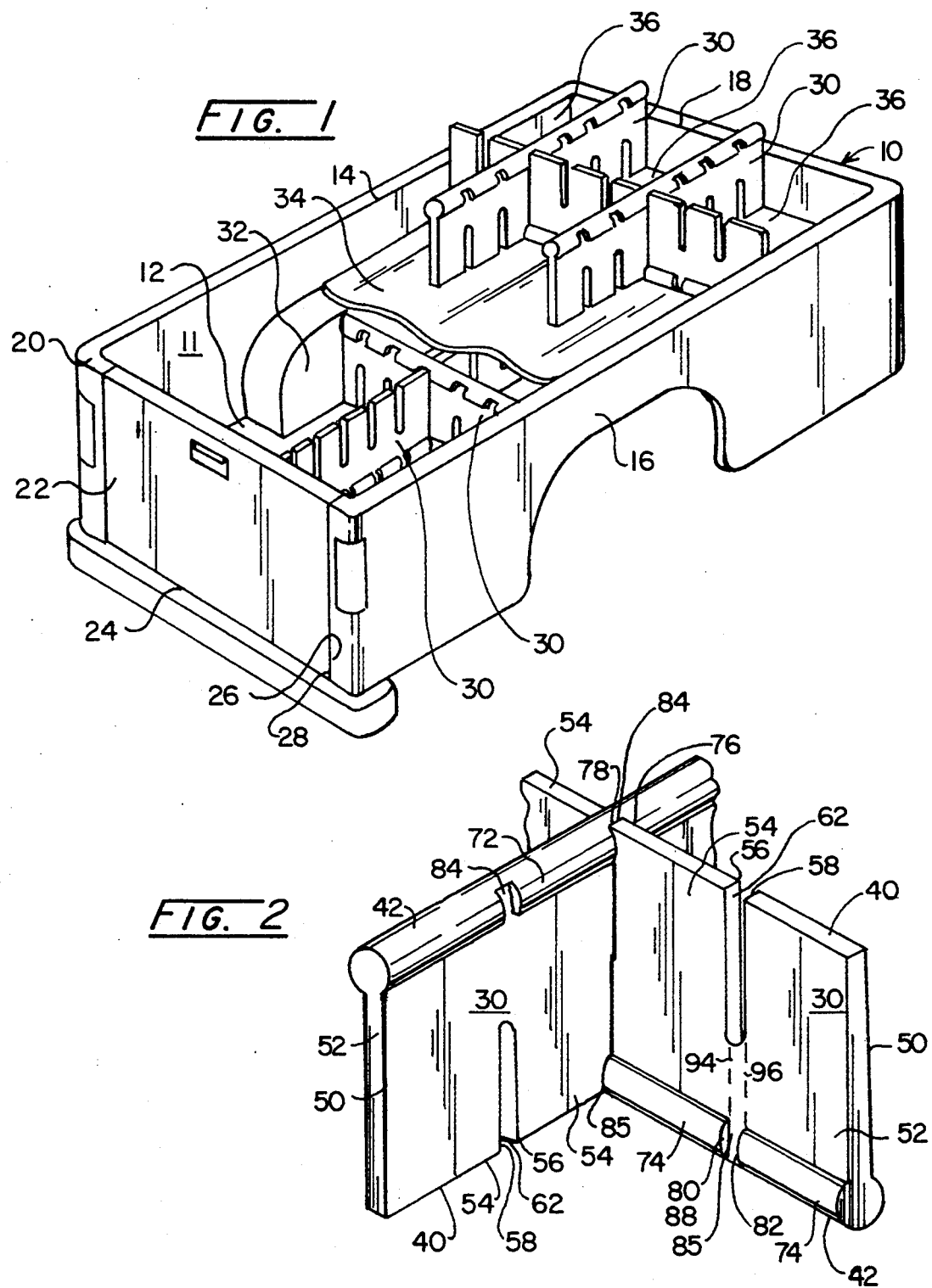

INTERLOCK PANEL

BACKGROUND OF THE INVENTION

Interlocking divider panels are utilized to provide a self-supporting grid structure which divides a cargo space into a plurality of desired size compartments.

Almost all automotive vehicles in use today provide some type of cargo storage space. Pickup trucks have beds which provide storage space. Vans make storage space available on floor areas in and around rear seating areas. Automobiles have enclosed trunks or flat areas behind the seats which may be utilized as storage space.

Although such storage spaces allow some items to be conveniently transported within a vehicle, these spaces are inconvenient for storage of items which spill easily if tipped or which do not tend to remain in one position in the cargo storage space when the vehicle is in motion. These items may include grocery bags, liquid containers, tools, advertising brochures, salesperson's samples, briefcases, suitcases, sports equipment, etc. The problem stems from the fact that most vehicle cargo storage spaces are little more than a horizontal planer floor or bed area enclosed by vertical walls which define the perimeter of the cargo spaces. For the most part, the distances between the walls defining the spaces are far too great to provide any type of restraint to horizontal movement of items stored within the space. Grocery bags set in a pickup truck bed, a van floor or an automobile trunk almost invariably tip over when the vehicle is in motion. Similarly, a sport's item such as a bowling ball will roll or slide across the horizontal surface of a cargo storage space during the time the vehicle is in motion because of lack of restraint. Of course there are many other items which will behave in a similar manner when placed upon the planer surface of a cargo space during movement of the vehicle.

Cargo stored within a vehicle storage area may be prevented from spilling, rolling, sliding or otherwise moving across the planer surface of the space by utilizing one of a number of different types of restraints. Cargo may be fastened in place by means of a rope, a resilient cord known by the trademark Bungie Cord, a strap, etc. These restraints are inconvenient and difficult to apply to many items. Items also may be restrained by vertical barriers such as nets or rigid, vertical, cargo space divider elements.

One problem with making a suitable vehicle cargo space divider structure resides in the fact that cargo spaces have many different dimensions. Consequently, it becomes difficult to provide a cargo space divider structure which will accommodate various sizes of cargo storage spaces without custom building a space divider structure for each space. Additionally, because items within a cargo storage space may tend to shift or move during movement of the vehicle, relatively heavy items may impose high lateral forces on the side walls of a cargo space divider structure, such that the structure would tend to collapse or suffer damage when restraining these items. Furthermore, inasmuch as items having a wide variety of dimensions are placed in cargo storage spaces, any type of cargo space divider structure must be capable of adjustment to accommodate items having different lateral dimensions. Also, any type of cargo divider structure should be capable of accommodating cargo having a relatively large vertical dimension to prevent such cargo from shifting or falling over within the cargo compartment.

Consequently, it becomes desirable to provide a vehicle cargo space divider structure to prevent lateral movement of cargo across the planer surface of a cargo space which may be adjusted to accommodate cargo spaces having a range of sizes. The space divider structure should be easily adjustable to provide different sized compartments for various types of cargo and should be easily collapsible when it is not needed. Preferably, the structure should be able to absorb relatively high lateral load forces imposed by cargo shifting during vehicle movement without collapsing or being damaged and without damaging the wall defining the cargo space. Also, the space divider structure should be vertically adjustable or stackable to accommodate items having a relatively large vertical dimension. Lastly, it would be desirable to provide a cargo space divider structure which would provide a structural base for receiving a second planer surface which provides a floor for receipt of a second vertical level of space divider structure.

SUMMARY OF THE INVENTION

An interlocked panel adapted to cooperate with at least one other interlocked panel forms a space divider structure having a plurality of individual compartments of a desired size. The panel comprises a rigid unitary member having a base, a top surface, a central portion intermediate said base and said top surface, first and second end surfaces which define the length of said member and spaced first and second side surfaces which define the thickness of the member. A plurality of laterally spaced teeth are formed on the member which project outwardly from the central portion of the member. Each of the teeth has a pair of lateral side walls and longitudinally extending front tooth edge formed from the portion of the base. Spaced lateral side walls of adjacent teeth define a lateral tooth slot having a bottom slot edge which adjoins the lateral side walls. A tooth slot extension surface area is formed on each of the first and second side surfaces adjacent each lateral tooth slot with each area having a bottom edge defined by the bottom edge of the slot, a top edge defined by the panel top surface and a pair of side edges defined by the parallel extensions of said pair of adjacent tooth side walls outwardly between the bottom slot edge and the top surface. A pair of spaced lugs are mounted on the first side surface. Each of the lugs has an end wall which extends generally parallel with and is laterally spaced from one lateral side wall of a pair of adjacent teeth. The pair of lugs are separated such that their end walls define a first interlock slot on said first she surface of the first panel. At least one of the lateral tooth slots is aligned with the first interlock slot such that the longitudinal axis of the tooth slot extends through the first interlock slot.

DESCRIPTION OF THE DRAWINGS

FIG. 1 is a perspective view of a plurality of interlock panels cooperating to form a cargo space divider structure in the bed of a truck;

FIG. 2 is an enlarged partial view of a pair of interlock panels showing the interlock of one panel with the other;

DESCRIPTION OF THE PREFERRED EMBODIMENT

Figure 3:
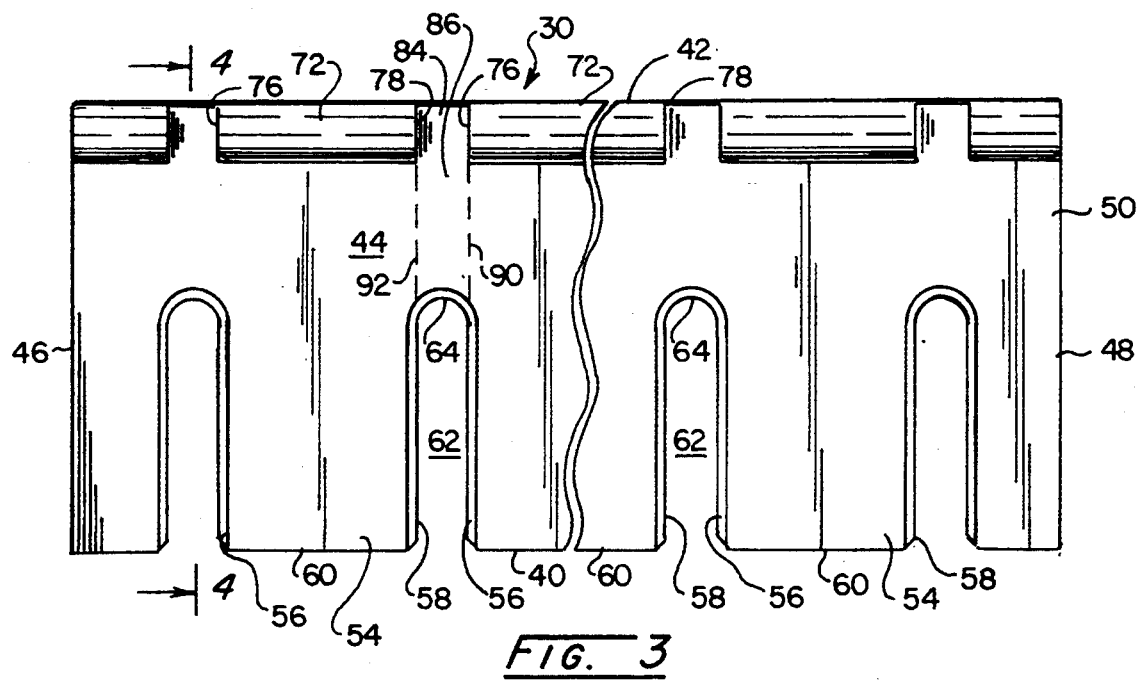
FIG. 3 is a side view of an interlock panel.

FIG. 1 depicts a cargo box (10) adapted to be mounted on the frame structure of a truck, not shown. The cargo box (10) provides a cargo space (11) defined by a horizontally extending planer floor or bed (12), a pair of longitudinally extending vertical walls (14 and 16) which project upwardly from bed (12) and a pair of laterally extending vertical walls (18 and 20) which project upwardly from floor (12) and join one end of each of the longitudinal walls (14 and 16). A tailgate or door (22) forms a portion of lateral wall (20). The bottom edge (24) of door (22) may be pivotally attached to bed (12) to enable the door to pivot downwardly about a horizontal axis to provide access to the cargo space (11). Alternatively, door (22) may have a side edge (26) pivotally attached to a vertical wall portion (28) of lateral wall (22) to enable door (22) to pivot about a vertical axis to provide an access to the cargo space (11) within box (10).

Looking again to FIG. 1, it may be observed that the cargo space (11) contains a plurality of interlock panels (30) which rest upon floor (12) and define a plurality of cargo storage compartments (32). It may be observed that a horizontal planar surface (34) rests upon the top of the interlock panels (30) resting on floor (12) to provide a second floor within the cargo box (10). A plurality of interlock panels (30) rests upon surface (34) and define a second level of cargo storage compartments (36).

It should be noted that the interlock panels (30) may be interlocked to define different sized storage compartments (32 and 36) as will be described in detail hereinbelow. Also, it should be seen that the interlock panels (30) may occupy only a portion of floor (12) or planar surface (34) to thus provide space for larger items which may not be accommodated by the compartments defined by the interlock panels (30).

Figure 4:
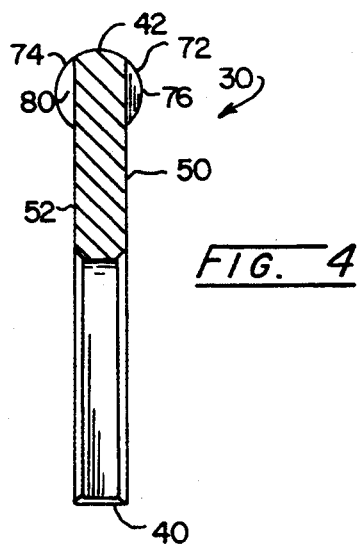
FIG. 4 is a view along line 4—4 of FIG. 3.

A single interlock panel (30) may be seen in detail by referring to FIGS. 3 and 4. Preferably, the interlock panel (30) is a rigid, unitary molded plastic structure. Each panel (30) has a base (40), a top surface (42) and a central portion (44) which extends between said base (40) and said top surface (42). Base (40) and top surface (42) define the height of panel (30). The length of panel (30) is defined by a pair of end surfaces (46 and 48). A pair of opposite side surfaces (50 and 52) define the thickness of panel (30). Panel (30) may have any desired length, height or thickness. A plurality of laterally spaced teeth (54) project outwardly from the central portion (54) of panel (30). Each tooth (54) has a pair of lateral side walls (56 and 58) and a longitudinally extending front tooth edge (60) formed from a portion of base (40). It may be seen that the spaced lateral side walls (56 and 58) of adjacent teeth (60) define a lateral tooth slot (62). The bottom of slot (62) is defined by a bottom slot edge (64) which joins the lateral side walls (56 and 58).

Interlock panel (30) has a plurality of laterally spaced lugs (72) integral with side surface (50) which project longitudinally adjacent top surface (42). A plurality of laterally spaced lugs (74) are formed integral with side surface (52) and also project longitudinally adjacent top surface (42). Each of the lugs (72) has a pair of lateral end walls (76 and 78) whereas each of the lugs (74) has a pair of lateral end walls (80 and 82). Referring again to FIG. 3, it may be observed that the lateral end walls (76 and 78) extend generally parallel with the lateral side walls (56 and 58) respectively which define slot (62). Similarly, lateral end walls (80 and 82) extend substantially parallel with the lateral side walls (56 and 58).

Figure 7:
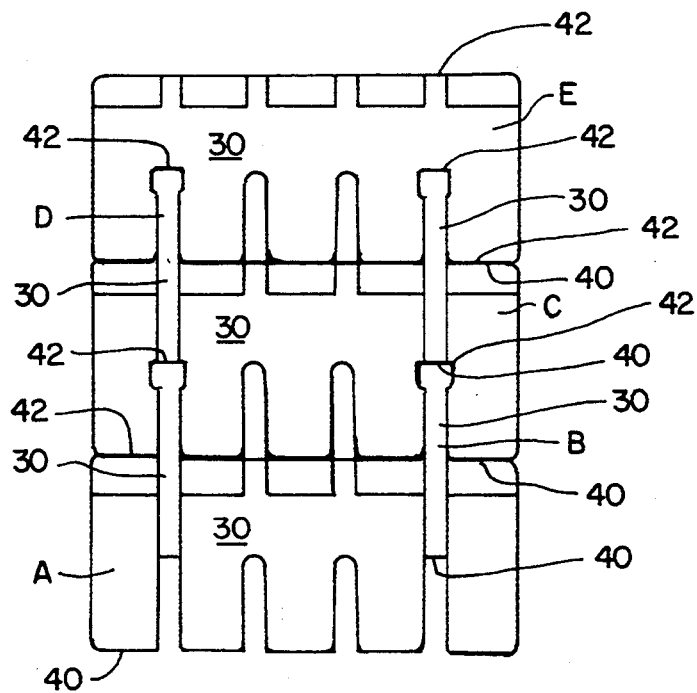
FIG. 7 is a side view showing a plurality of interlock panels interlocked for vertical stacking.

A tooth slot extension surface area (86) is defined on side surface (50) whereas a tooth slot extension surface (88) is defined on side surface (52) of panel (30). The tooth slot extension surfaces (86 and 88) are adapted to receive one of the lateral side walls (56 and 58) when a pair of panels (30) are interlocked as illustrated in FIGS. 1, 2 and 7 and described in detail hereinbelow. The tooth slot extension surface (86) is an area having a bottom edge defined by the bottom edge (64) of slot (62), a top edge defined by the panel top surface (42) and a pair of side edges defined by the parallel extensions of the side walls (56 and 58) of a tooth (54) and illustrated by dashed lines (90 and 92). Tooth slot extension surface (88) is an area having a bottom edge defined by said bottom slot edge (64), said panel top surface (42) and a pair of side edges defined by the parallel extensions of said pair of adjacent tooth side walls (56 and 58) and illustrated by dashed lines numbered (94 and 96) respectively.

The lateral end walls (76 and 78) of adjacent lugs (72) define an interlock slot (84) therebetween. Similarly, the lateral end walls (80 and 82) of adjacent lugs (74) define at an interlock slot (85) on the side surface (52) of panel (30).

Looking again to FIG. 3, it may be observed that the longitudinal axis of tooth slot (62) extends through the center of the tooth slot extension surface (86) and the center of interlock slot (84) on side surface (50) and through the center of the tooth slot extension surface (88) and the center of interlock slot (85) of side surface (52).

Referring 5in to FIG. 1, it may be served that two or more interlock panels (30) may be interlocked to divide a cargo space into storage compartments of a desired size. For small cargo spaces two interlock panels (30) may be utilized to define four compartments of a desired size. For larger cargo spaces, three or more interlock panels (30) may be utilized to define compartments having a desired size. Turning to FIG. 1, it may be observed that three panels (30) resting on floor (34) are interlocked to divide the cargo space (11) into six compartments.

Interlocking a pair of interlock panels now will be described by referring to FIG. 2. It may be seen that the pair of panels (30) are interlocked at right angles to each other by having a top surface (42) of a first panel and the bottom surface (40) of a second panel rest upon a planer surface. In assembly the second panel is adjusted such that the side walls (56 and 58) of adjacent teeth (54) overlie the tooth slot extension surfaces (86 and 88) on the first panel. As this occurs, the lateral side walls (56 and 58) on a pair of adjacent teeth (54) of the first panel are made to overlie the tooth slot extension surfaces (86 and 88) of the second panel. When the first and second panels (30 and 30) are finally interlocked, a pair of adjacent teeth (54 and 54) of the first panel are received in the interlock slots (84 and 85) formed in the second panel and a pair of adjacent teeth (54 and 54) of the second panel are received in the interlock slots (84 and 85) formed in the first panel. When the teeth (54) are received in the interlock slots (84 and 85) of the opposite panel, the two panels (30 and 30) are maintained rigidly in a perpendicular relationship. In order to change the spacing between respective panels, an operator needs only to grasp the lugs (72 and 74) formed on the second panel (30) and raise the panel (30) vertically upwardly until its teeth (54 and 54) disengage the interlock slots (84 and 85) of the first panel and the lateral side walls (56 and 58) of the adjacent teeth no longer overlie the tooth slot extension surfaces (86 and 88) on that panel. It may be observed that the lugs (74 and 76) make excellent handles for lifting a panel. Thereafter, the panels may be adjusted to obtain compartments of a desired size.

In FIGS. 1 and 2 compartments are formed by interlocking panels at right angles where panels that extend in one direction are arranged such that the top surfaces (42) rest against the horizontal planar surface and the panels that extend at right angles thereto are arranged such that their bases (40) engage the horizontal planar surface and their top surfaces (42) are remote therefrom. When panels (30) are interlocked in this manner the compartments have a uniform height.

As stated previously, oftentimes it becomes desirable to have compartments which are greater in height than the height of a single panel to accommodate the cargo of an unusual height. The unique interlock panels (30) of the instant invention may be assembled in such a manner as to provide compartment walls of almost any desired height. Turning to FIG. 7, it may be observed that in contrast to the panels depicted in FIGS. 1 and 2 where panels extending in opposite directions are inverted with respect to each other, all of the panels (30) are arranged to have the same orientation. In order to stack panels (30) as depicted in FIG. 7, the panels (30) are arranged such that a first row A of panels (30) are positioned in parallel alignment. Only one panel in row A is depicted in FIG. 7. Thereafter, a second row B of panels (30) are stacked on top of and perpendicular to the panels comprising row A. In other words, the panels (30) in row B are arranged such that the lateral side walls (56 and 58) of a pair of adjacent teeth (54) are inserted into the interlock slots (84 and 85) until the bottom slot edge (64) engages the top surface (42) of a panel in row A. Subsequently, panels in row C are arranged in parallel alignment with the row A panels (30). Again, the lateral side walls (56 and 58) of a pair of adjacent teeth (54) on the panels in row C are inserted into the interlock slots (84 and 85) of the panels in row B until the bottom slot edges (64) engage the top surface (42) of the row B panels. In a similar manner, the panels in row D are arranged in parallel alignment with the panels of row B and the panels in row E are arranged in parallel alignment with those of rows C and A. In this manner, compartments of almost any desired height may be constructed from the interlock panels (30).

It has been found that in many instances, the walls defining the cargo space (11) have an irregular shape. Such an irregular wall may be seen by referring to FIG. 5 where wall (100) projects upwardly from planer floor (12) to define cargo space (111). Additionally, it has been found that cargo in compartments formed from a grid of interlock panels (30) often shifts during vehicle movement and impacts the panels (30) with significant force. It has been found that damage to the cargo side wall (100) may be reduced by having the interlock panels (30) securely mounted within the cargo space (111).

Figure 5:
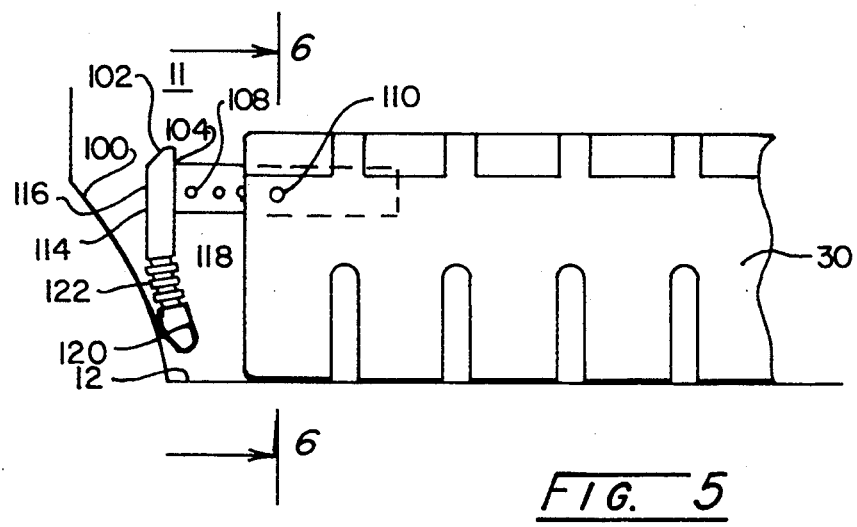
FIG. 5 is a side view of an interlock panel having an adjustable length extension means set in a cargo space.
Figure 6:
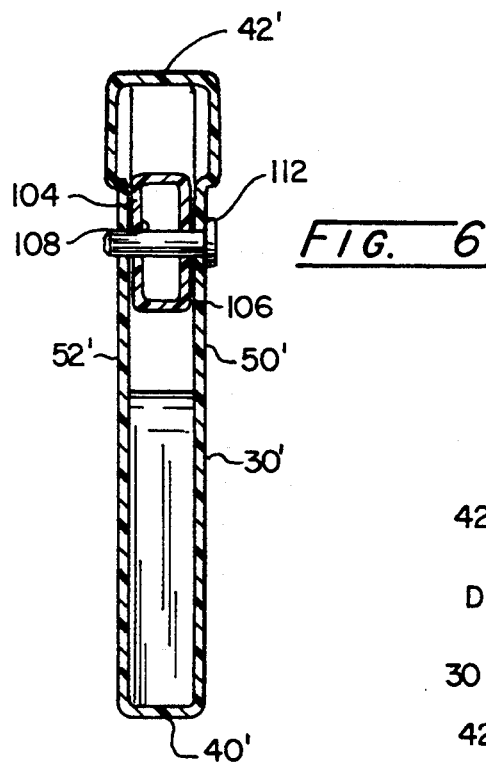
FIG. 6 is a view along line 6—6 of FIG. 5.

Turning to FIGS. 5 and 6, it may be observed that a length adjustment device (102) projects from one end of an interlock panel (30'). The interlock panel (30') is substantially the same as the interlock panel (30) described above and identical elements will be noted by identical primed numbers. The length adjustment device (102) enables the interlock panel (30') to fit securely against the wall (100) which defines the cargo space (111) to thereby reduce impact damage to the wall (100). The length adjustment device (102) has a longitudinally extending adjustment arm (104) which telescopes within an opening (106) formed within panel (30'). A plurality of lateral bores (108) are formed in adjustment arm (104). Bores (108) align with a similar sized bore (110) formed in interlock panel (30') as adjustment arm (104) is telescoped within panel (30'). A pin (112) enters panel bore (110) and a bore (108) to secure adjustment arm (104) in a set position. Adjustment arm (104) may be extended or retracted within panel opening (106) to secure panel (30') into engagement with wall (100).

Length adjustment device (102) has a laterally extending support arm (114) having an upper end (116) rigidly secured to the outer end (118) of adjustment arm (104). Support arm (114) has a lower end (120) adapted to engage wall (100). A flexible spring bellows (122) connects the upper and lower ends (160 and 120) of support arm (114). The flexible bellows (122) functions as a lateral impact absorbing device to reduce the amount of force transmitted to the cargo wall (100) when cargo contained by an interlock panel (30') shifts and applies a lateral force to the panel (30'). It has been found desirable to form length adjustment device (102) as a unitary molded plastic element. Preferably the flexible spring bellows (122) would be molded integrally with the other elements of the length adjustment device (102).

From the above, it may be seen that the length adjustment device (102) may be utilized to cause interlock panel (30') to fit securely against the wall (100) which defines a cargo space (111). Additionally, flexible spring bellows (122) mounted on the support arm (114) of the length adjustment device (102) causes the device to absorb a substantial amount of the lateral impact forces applied to the panel (30') by a cargo element during vehicle movement.

Since certain changes may be made to the above-described structure and method without departing from the scope of the invention herein it is intended that all matter contained in the description thereof or shown in the accompanying drawings shall be interpreted as illustrative and not in a limiting sense.

I claim:

1. An interlock panel having a pair of spaced sidewalls adapted to cooperate with at least one other interlock panel having a pair of spaced sidewalls such that the sidewalls of both panels are aligned vertically with respect to each other to form a space divider structure having plurality of individual compartments of a desired size which comprises:

a rigid unitary member having a base, a top surface, a central portion intermediate said base and said top surface, first and second end surfaces which between them define a length of said member and spaced first and second side surfaces which between them define a thickness of said member;

a plurality of laterally spaced teeth formed in said member which project outwardly from said central portion of said member;

wherein each of said teeth has a pair of lateral sidewalls and a longitudinally extending front tooth edge formed from a portion of said base;

wherein spaced lateral sidewalls of adjacent teeth define a lateral tooth slot having a bottom slot edge which joins said lateral sidewalls;

a tooth slot extension surface area formed on each of said first and second side surfaces adjacent each lateral tooth slot with each area having a bottom edge defined by said bottom edge of said slot, a top edge defined by said panel top surface and a pair of side edges defined by the parallel extensions of said pair of adjacent tooth sidewalls outwardly between said bottom slot edge and said top surface;

at least one pair of spaced lugs on said first side surface located between said bottom slot edge of said lateral tooth slot and said top surface each of which extends laterally outwardly of said first side surface;

wherein each of said lugs has a lateral end wall which projects laterally outwardly from said first side surface and which is parallel to and laterally spaced from one lateral sidewall of a pair of adjacent teeth along a longitudinal axis of said first interlock slot;

wherein said pair of lugs are separated such that said lateral end walls of said lugs cooperate with said first side surface to define a first interlock slot on said first side surface of said first panel adapted to receive a tooth of a mating second interlock panel such that said tooth engages each of said end walls; and at least one of said lateral tooth slots is aligned with said first interlock slot such that a longitudinal axis of said tooth slot extends through said first interlock slot.

2. The interlock panel of claim 1 in which a portion of one of said lateral tooth slot extension surface areas on said first side surface extends into said first interlock slot.

3. The interlock panel of claim 1 in which said pairs of adjacent lugs are separated by a distance substantially equal to the distance between the lateral side walls of a pair of adjacent teeth which distance defines the width of said lateral tooth slot.

4. The interlock panel of claim 1 in which the length of at least one lug is substantially equal to the distance between the lateral sidewalls of a tooth which distance defines the length of said front edge of a tooth.

5. The interlock panel of claim 1 in which said pair of spaced lugs extend longitudinally adjacent said top surface.

6. The interlock panel of claim 1 further comprising:
a second pair of spaced lugs on said second side surface located between said bottom slot edge of said lateral tooth slot and said top surface;

wherein each of said second pair of lugs has a lateral end wall which projects laterally outwardly said second side surface and which is parallel to and laterally spaced from one lateral sidewall of a pair of adjacent teeth along a longitudinal axis of said first interlock slot;

wherein said second pair of lugs are separated such that said lateral end walls of said lugs cooperate with said second side surface to define a second interlock slot on said second side surface of said first panel adapted to receive a second tooth of said mating second interlock panel such that said second tooth engages each of said end walls; and at least one of said lateral tooth slots is aligned with said second interlock slot such that said longitudinal axis of said tooth slot extends through the center of said second interlock slot.

7. The interlock panel of claim 6 in which one of said lateral tooth slot extension surfaces areas on said first side surface extends into said first interlock slot and one of said lateral tooth slot extension surface areas on said second side surface extends into said second interlock slot.

8. The interlock panel of claim 6 in which said second pair of adjacent lugs are separated by a distance substantially equal to the distance between the lateral sidewalls of a pair of adjacent teeth which distance defines the width of said lateral tooth slot.

9. The interlock panel of claim 6 in which the length of at least one of said second pair of lugs is substantially equal to the distance between the lateral sidewalls of a tooth which distance defines the length of said front edge of a tooth.

10. The interlock panel of claim 6 in which said second pair of spaced lugs extend longitudinally adjacent said top surface.

11. The interlock panel of claim 6 in which said first and second interlock slots extend downwardly from said top surface in parallel alignment.

12. The interlock panel of claim 1 in which the bottom edge of said slot has a width substantially equal to the thickness of said member.

13. The interlock panel of claim 1 further comprising adjustable length extension means for extending the length of said panel attached to one end surface of said panel.

14. The interlock panel of claim 13 in which said length extension means has a movable adjustment member; and
said adjustment member is movable between an extended position in which it is away from said one end surface of said panel and a retracted position in which it is adjacent said to said one end surface of said panel.

15. The interlock panel of claim 14 in which one of said end surfaces defines an opening in said interlock panel and said adjustment member is telescopically received in said panel.

16. The interlock panel of claim 13 further comprising lock means for locking said adjustment member in one of said retracted or extended positions.

17. The interlock panel of claim 13 in which said adjustment member further comprises an adjustment arm having an inner end which telescopes in said end surface opening and a support arm mounted at an outer end of said adjustment arm which extends generally parallel to said end surface.

18. The interlock panel of claim 17 in which said support arm has an upper end attached to said adjustment member, a lower end remote form said adjustment member and a resilient flexure means for resiliently joining said upper and lower ends to enable one of said upper and lower ends to flex with respect to the other of said upper and lower ends.

19. The interlock panel of claim 18 in which said resilient flexure means includes a spring bellows.

20. The interlock panel of claim 19 in which said adjustment member is a unitary piece of molded plastic and said spring bellows in molded integrally in said adjustment member.

21. An interlock panel adapted to cooperate with a second interlock panel to form a plurality of individual compartments of a desired size which comprises:
   a rigid unitary member having a base, a top surface, a central portion, first and second end surfaces which between them define a length of said member and spaced first and second side surfaces which between them define a thickness of said member;
   a plurality of laterally spaced teeth formed in said member which extend outwardly from said central portion of said member;
   wherein each of said teeth has a pair of lateral sidewalls and a longitudinally extending front tooth edge formed from a portion of said base;
   wherein spaced lateral sidewalls of adjacent teeth define a lateral tooth slot having a bottom edge which joins said lateral sidewalls;
   adjustable length extension means for extending the length of said panel; and
   wherein said length extension means has a movable adjustment member.

22. The interlock panel of claim 21 in which said adjustment member is movable between an extended position in which it is away from said one end surface of said panel and a retracted position in which it is adjacent to said one end surface of said panel.

23. The interlock panel of claim 22 further comprising lock means for locking said adjustment member in one of said retracted or extended positions.

24. The interlock panel of claim 21 in which one of said end surfaces defines an opening in said interlock panel which receives said adjustment member wherein said adjustment member has an adjustment arm with an inner end which telescopes in said end surface opening and a support arm mounted at an outer end of said adjustment arm which extends generally parallel to said end surface.

25. The interlock panel of claim 24 in which said support arm has an upper end attached to said adjustment member, a lower end remote form said adjustment member and a resilient flexure means for resiliently joining said upper and lower ends to enable one of said upper and lower ends to flex with respect to the other of said upper and lower ends.

26. The interlock panel of claim 25 in which said resilient flexure means includes a spring bellows.

27. The interlock panel of claim 26 in which said adjustment member is a unitary piece of molded plastic and said spring bellows in molded integrally in said adjustment member.

28. First and second interlock panels adapted to cooperate with each other to form a plurality of individual compartments of a desired size each comprising:
   a rigid unitary member having a base, a top surface, a central portion intermediate said base and said top surface, first and second end surfaces which between them define a length of said member and spaced first and second side surfaces which between them define a thickness of said member;
   a plurality of laterally spaced teeth formed in said member which project outwardly from said central portion of said member;
   wherein each of said teeth has a pair of lateral sidewalls and a longitudinally extending front tooth edge formed from a portion of said base;
   wherein spaced lateral sidewalls of adjacent teeth define a lateral tooth slot having a bottom slot edge which joins said lateral sidewalls;
   a tooth slot extension surface area formed on each of said first and second side surfaces adjacent each lateral tooth slot with each having a bottom edge defined by said bottom edge of said slot, a top edge defined by said top surface and a pair of edges defined by the parallel extensions of said pair of adjacent tooth sidewalls outwardly from said bottom edge to said top surface;
   at least one pair of spaced lugs on said first side surface located between said bottom slot edge of said lateral tooth slot and said top surface;
   wherein each of said lugs has a lateral end wall which projects laterally outwardly from said first side surface and which is parallel to and laterally spaced from one lateral sidewall of a pair of adjacent teeth along a longitudinal axis of said first interlock slot;
   wherein said pair of lugs are separated such that said lateral end walls of said lugs cooperate with said first side surface to define a first interlock slot on said first side surface of said first panel adapted to receive a tooth of a mating second interlock panel such that said tooth engages each of said end walls;
   wherein at least one of said lateral tooth slots is aligned with one of said first interlock slot such that a longitudinal axis of said tooth slot extends through a center of said first interlock slot; and
   wherein said first and second interlock panels are interlocked such that said lateral slot extension of said first interlock panel is received in said lateral tooth slot in said second interlock panel, said lateral slot extension of said second interlock panel is received in said lateral tooth slot in said first interlock panel, one of said teeth on said first interlock panel being received between and engaged by said pair of lugs defining said first interlock slot on said second panel and a tooth on said second interlock panel being received between and engaged by said pair of lugs defining said first interlock slot on said first panel.

29. First and second interlock panels adapted to cooperate with each other to form a plurality of individual compartments of a desired size each comprising:
   a rigid unitary member having a base, a top surface, a central portion intermediate said base and said top surface, first and second end surfaces which between them define a length of said member and spaced first and second side surfaces which between them define a thickness of said member;
   a plurality of laterally spaced teeth formed in said member which project outwardly from said central portion of said member;
   wherein each of said teeth has a pair of lateral sidewalls and a longitudinally extending front tooth edge formed from a portion of said base;
   wherein spaced lateral sidewalls of adjacent teeth define a lateral tooth slot having a bottom slot edge which joins said lateral sidewalls;
   a tooth slot extension surface area formed on each of said first and second side surfaces adjacent each lateral tooth slot with each area having a bottom edge defined by said bottom edge of said slot, a top edge defined by said top surface and a pair of edges defined by the parallel extensions of said pair of adjacent tooth sidewalls outwardly from said bottom edge to said top surface;

at least one pair of spaced lugs on said first side surface located between said bottom slot edge of said lateral tooth slot and said top surface;

wherein each of said lugs has a lateral end wall which projects outwardly from said first side surface and which is parallel to and laterally spaced from one lateral sidewall of a pair of adjacent teeth along a longitudinal axis of said first interlock slot;

wherein said pair of lugs are separated such that said lateral end walls of said lugs cooperate with said first side surface to define a first interlock slot on said first side surface of said first panel adapted to receive a tooth of a mating second interlock panel such that said tooth engages each of said end walls;

wherein at least one of said lateral tooth slots is aligned with said first interlock slot such that a longitudinal axis of said tooth slot extends through said first interlock slot; and wherein said first and second interlock panels are interlocked such that said lateral slot extension of said second interlock panel is received in said lateral tooth slot in said first interlock panel such that said bottom slot edge of said second interlock panel engages said bottom slot edge of said slot in said first interlock panel and one of said teeth of said first interlock panel are received in said first interlock slot in said second interlock panel and engage said lateral end walls of said first interlock slot.

* * * * *